(12) United States Patent
Narita

(10) Patent No.: US 11,843,738 B2
(45) Date of Patent: Dec. 12, 2023

(54) INFORMATION PROCESSING APPARATUS HAVING MULTIFACTOR AUTHENTICATION FUNCTION, CONTROL METHOD, AND STORAGE MEDIUM

(71) Applicant: CANON KABUSHIKI KAISHA, Tokyo (JP)

(72) Inventor: Yuki Narita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/822,719

(22) Filed: Aug. 26, 2022

(65) Prior Publication Data
US 2023/0171355 A1   Jun. 1, 2023

(30) Foreign Application Priority Data

Sep. 3, 2021   (JP) ................. 2021-143746

(51) Int. Cl.
| | | |
|---|---|---|
| *G06K 15/00* | (2006.01) | |
| *G06K 15/02* | (2006.01) | |
| *H04N 1/00* | (2006.01) | |
| *G06F 21/36* | (2013.01) | |

(52) U.S. Cl.
CPC ......... *H04N 1/00514* (2013.01); *G06F 21/36* (2013.01); *H04N 1/00416* (2013.01); *H04N 1/00506* (2013.01); *H04N 1/00854* (2013.01)

(58) Field of Classification Search
CPC .......... H04N 1/00514; H04N 1/00416; H04N 1/00506; H04N 1/00854; G06F 21/36
See application file for complete search history.

(56) References Cited

U.S. PATENT DOCUMENTS

| | | | |
|---|---|---|---|
| 2015/0124277 A1 | 5/2015 | Ono et al. | |
| 2016/0044044 A1* | 2/2016 | Takamiya | H04L 63/10 726/7 |
| 2017/0052745 A1* | 2/2017 | Kanematsu | G06F 3/1267 |
| 2017/0257363 A1 | 9/2017 | Franke et al. | |
| 2017/0286648 A1 | 10/2017 | Yamaguchi et al. | |

FOREIGN PATENT DOCUMENTS

| | | | |
|---|---|---|---|
| JP | 2011054120 A | | 3/2011 |
| JP | 2019028961 A | * | 2/2019 |
| JP | 2019155610 A | | 9/2019 |

OTHER PUBLICATIONS

Haron et al.; "User Behaviour and Interactions for Multimodal Authentication"; 2016 14th Annual Conference on Privacy, Security and Trust (PST), IEEE, Dec. 12, 2016, pp. 309-316.

\* cited by examiner

*Primary Examiner* — Moustapha Diaby
(74) *Attorney, Agent, or Firm* — Canon U.S.A., Inc. IP Division

(57) ABSTRACT

An information processing apparatus configured to authenticate a user in first authentication processing and second authentication processing and permit the user who is authenticated to use at least one of a plurality of functions includes a control unit configured to, at a time of authentication of the user in the first authentication processing, perform control to prompt the user to select an authentication method to be used in the first authentication processing.

10 Claims, 10 Drawing Sheets

| AUTHENTICATION SETTING SCREEN (MULTIFACTOR AUTHENTICATION SETTING) |

MULTIFACTOR AUTHENTICATION SETTING: ■ ALL USERS — 502
☐ ADMINISTRATOR ONLY
☐ OFF

AUTHENTICATION USED FOR MULTIFACTOR AUTHENTICATION — 503

FIRST FACTOR ■ IC CARD AUTHENTICATION

SECOND FACTOR
■ PERSONAL IDENTIFICATION NUMBER
■ PATTERN
● 3×3  ○ 4×4  ○ 5×5

POLICY SETTING FOR SECOND FACTOR — 504

PERSONAL IDENTIFICATION NUMBER (1 TO 7 DIGITS)
PERSONAL IDENTIFICATION NUMBER WITH LESS THAN
SPECIFIED NUMBER OF DIGITS IS PROHIBITED.  · · · 4 DIGITS
PATTERN
1. PATTERN WITH LESS THAN SPECIFIED NUMBER
   OF DOTS IS PROHIBITED.  · · · 4 DIGITS
2. ENGLISH ALPHABET IS PROHIBITED  · · · ENABLED

SECOND FACTOR SETTING AT THE TIME OF FUNCTIONAL AUTHENTICATION — 505
☐ PRINT  PATTERN IS PROHIBITED
☐ COPY  BOTH AVAILABLE
⋮

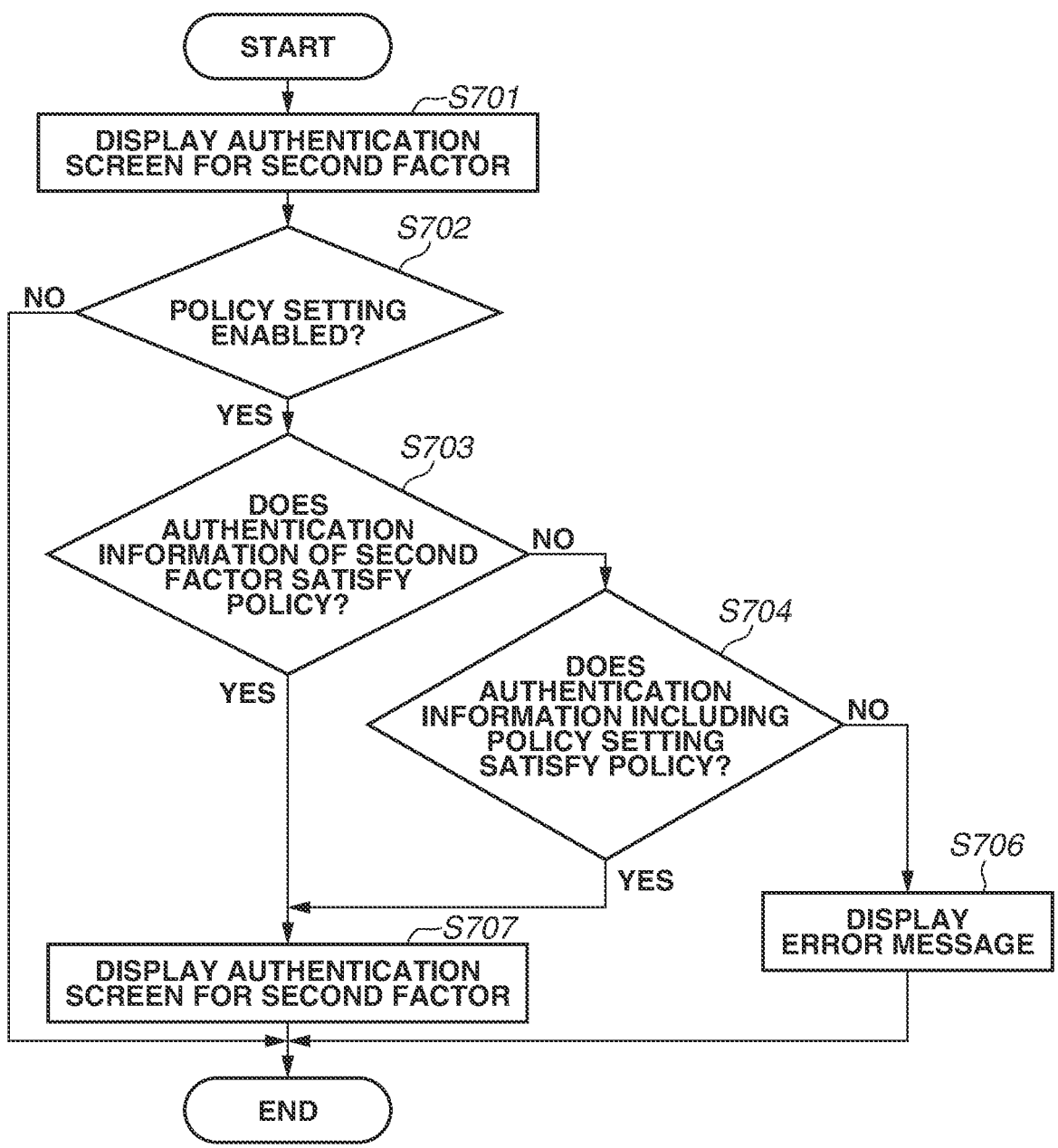

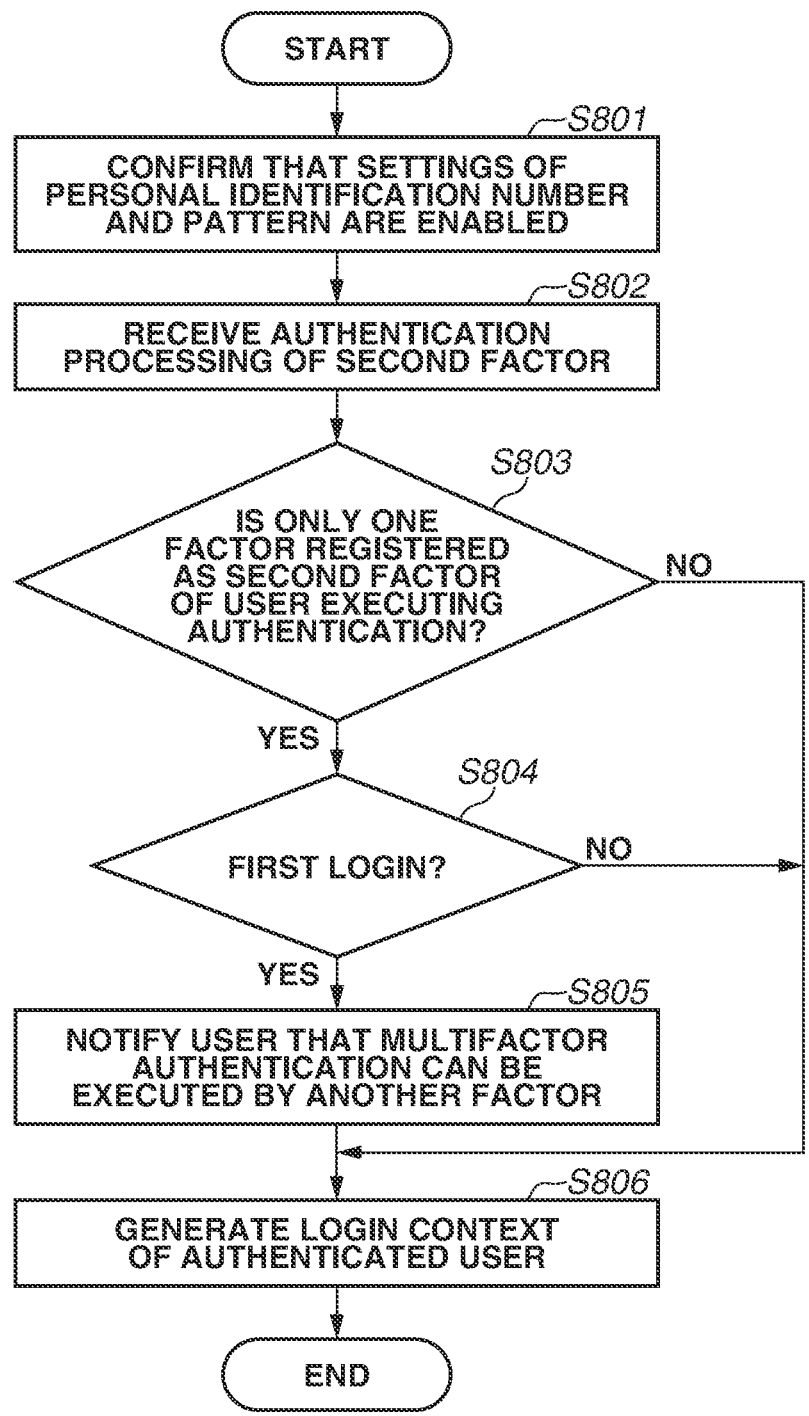

INFORMATION PROCESSING APPARATUS HAVING MULTIFACTOR AUTHENTICATION FUNCTION, CONTROL METHOD, AND STORAGE MEDIUM

BACKGROUND OF THE INVENTION

Field of the Invention

The present invention relates to an information processing apparatus having a multifactor authentication function, a control method, and a storage medium storing a program.

Description of the Related Art

Recently, cyberattacks have become sophisticated, and the introduction of multifactor authentication has progressed as a countermeasure against the attacks. There are three factors used in the multifactor authentication, namely, "knowledge information", "possession information", and "inherence information". The "knowledge information" is authentication information that only a user himself/herself knows, such as, a personal identification number or a pattern. The "possession information" is an integrated circuit (IC) card that only a user himself/herself possesses or a universal serial bus (USB) dongle for executing authentication processing by inserting a security key into a USB port. The "inherence information" is information and characteristics inherent in an organism possessed by a user such as a fingerprint, a vein, and a face.

The multifactor authentication that performs authentication by combining a plurality of the "knowledge information", "possession information" and "inherence information" is used and thus can counter a cyberattack and reduce a risk of unauthorized use of a system.

As a unit for authenticating a user at the time of use of an image forming apparatus such as a multifunction peripheral installed in an office, a unit for performing user authentication using an employee identification card (an IC card) is known. The unit is convenient and widely used because user authentication is completed by simply holding the IC card over the unit. On the other hand, according to Japanese Patent Application Laid-Open No. 2019-155610, an image forming apparatus is discussed that provides a multifactor authentication unit that uses a combination of an IC card that is the "possession information", biometric authentication, and the like.

As described above, image forming apparatuses that adopt multifactor authentication units are known. However, there is an issue that although security is enhanced if an administrator of an image forming apparatus enables a multifactor authentication setting, authentication processing is complicated depending on a setting content. Specifically, in a case where the multifactor authentication setting that uses an IC card in combination with a personal identification number is enabled, a user must hold the IC card over and input the personal identification number every time the user uses the image forming apparatus. Some people feel the authentication by the combination of the IC card and the personal identification number to be complicated, and others do not.

SUMMARY OF THE INVENTION

The present invention is directed to improving security by allowing the user to select at least one of authentication methods of multifactor authentication setting and to improving convenience in performing the multi-function authentication.

According to an aspect of the present invention, an information processing apparatus configured to authenticate a user in first authentication processing and second authentication processing and permit the user who is authenticated to use at least one of a plurality of functions includes a control unit configured to, at a time of authentication of the user in the first authentication processing, perform control to prompt the user to select an authentication method to be used in the first authentication processing.

Further features of the present invention will become apparent from the following description of embodiments with reference to the attached drawings.

BRIEF DESCRIPTION OF THE DRAWINGS

FIG. 5 illustrates an authentication setting screen provided by the image forming apparatus.

FIG. 7 is a flowchart illustrating policy confirmation at a time of execution of second factor screen display.

FIG. 8 is a flowchart illustrating display of a notification screen for another factor.

DESCRIPTION OF THE EMBODIMENTS

Various embodiments of the present invention will be described in detail below with reference to the attached drawings.

<System Configuration According to Present Embodiment>

Figure 1:
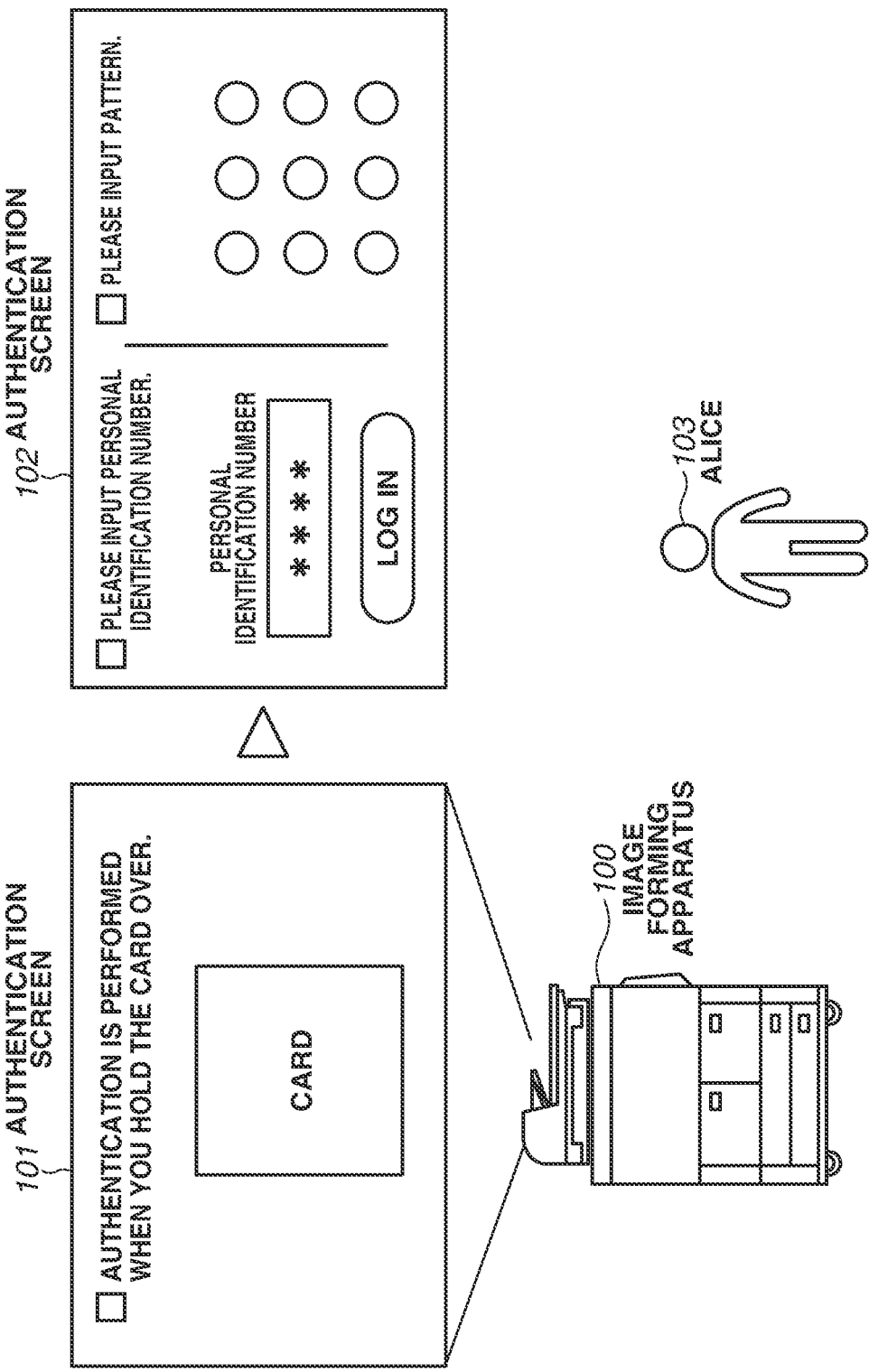
FIG. 1 is a schematic diagram illustrating a system configuration.

FIG. 1 is a schematic diagram illustrating a configuration of a system to which the present invention is applied. The system includes an image forming apparatus 100 that forms an image and is subjected to authentication processing, an authentication screen 101 on which integrated circuit (IC) card authentication to be used in multifactor authentication can be executed, an authentication screen 102 on which an input of a personal identification number or an input of a pattern to be used in the multifactor authentication can be executed, and a user Alice 103 who is registered in a user database.

The user Alice 103 is a user who has already registered a personal identification number and a pattern in the user database. In addition, when executing the multifactor authentication, the image forming apparatus 100 illustrated in FIG. 1 is set to implement the multifactor authentication by executing IC card authentication as a second factor authentication unit and the input of the personal identification number or the pattern as a first factor authentication unit. A selection operation for selecting an authentication method on the authentication screen 102 refers to an input operation in which either the personal identification number or the pattern is input in an area of personal identification number authentication or an area of pattern authentication on the authentication screen. Alternatively, the authentication method may be fixed by the selection operation for selecting the authentication method, and then the authentication screen corresponding to the selected authentication method may be displayed.

After executing the IC card authentication, the user Alice 103 inputs the personal identification number or the pattern to complete the authentication to the image forming apparatus 100, and thus can use a function of the image forming apparatus 100.

The image forming apparatus 100 defined herein is an information processing apparatus having a printer function, a copy function, a scan function, and a function of enabling IC card registration and editing of a password, a personal identification number, and a pattern using an authentication setting screen. In the present embodiment, the image forming apparatus 100 is described as an example, but the present invention is not necessarily limited to the image forming apparatus 100 having the printer function and others, and any information processing apparatus that can implement the multifactor authentication may be used.

What type of authentication processing is displayed on the authentication screen 102 in a selectable state is determined based on an administrator setting described below. The administrator setting refers to a setting that is made by a user, who has administrator authority, logging in to the image forming apparatus 100 using a local screen of the image forming apparatus 100 or a remote screen of a personal computer (PC) 315 and the like.

Here, a case is described where the authentication screen 102 includes an area for performing authentication by the personal identification number and an area for performing the pattern authentication. However, as long as the user can select the authentication method, options are not limited to the personal identification number authentication and the pattern authentication. In addition, a display order of the authentication screen 101 and the authentication screen 102 does not matter. Further, the authentication method may be selected by the user on the authentication screen 101 as with the authentication screen 102.

<Hardware Configuration of Image Forming Apparatus 100>

Figure 2:
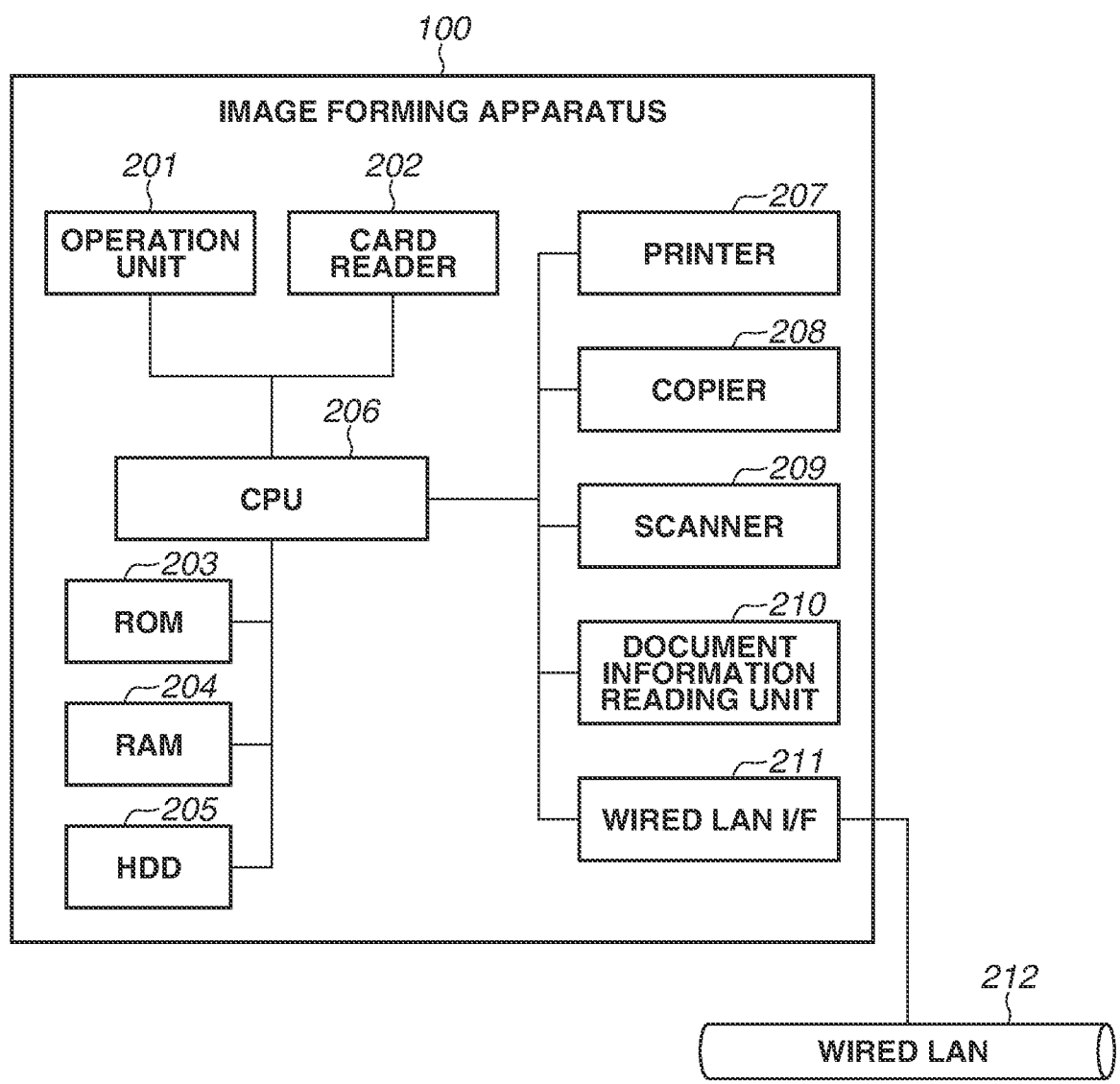
FIG. 2 illustrates a hardware configuration.

FIG. 2 is a hardware configuration diagram of the image forming apparatus 100 according to an embodiment. The image forming apparatus 100 includes a printer 207, a copier 208, a scanner 209, and a document information reading unit 210 that reads information on a scanned document. The image forming apparatus 100 further includes an operation unit 201 from which the image forming apparatus 100 is operated, a card reader 202 over which a card is held at the time of login, and a central processing unit (CPU) 206 that controls these units.

The printer 207 is a unit that implements a reception function and, for example, performs processing for forming an image corresponding to a print job received from the PC 315 connected to a wired local area network (LAN) 212 on the same network and outputting the image on a sheet. The copier 208 and the scanner 209 are units that implement a transmission function, and perform processing for optically reading an image of a document set in a scanner unit and outputting the read image as image data on a sheet.

The document information reading unit 210 reads information (a bar code, a QR code (registered trademark), and a copy-forgery-inhibited pattern) embedded in a document scanned by the scanner 209 and stores the read information in a hard disk drive (HDD) 205.

The CPU 206 dynamically controls various types of hardware 201, 202, and 206 to 211 included in the image forming apparatus 100 and thus can implement each of the functions of the image forming apparatus 100. The CPU 206 can transmit a signal to various types of hardware via a bus line and mutually perform data communication with other hardware. The operation unit 201 is a user interface for a user using the image forming apparatus 100 to use the printer 207, the copier 208, and the scanner 209. The operation unit 201 can also be operated as a touch panel. The card reader 202 is a unit for implementing authentication using a card.

Next, a software configuration according to the present embodiment is described with reference to FIG. 3.

<Software Configuration of Image Forming Apparatus 100>

Figure 3:
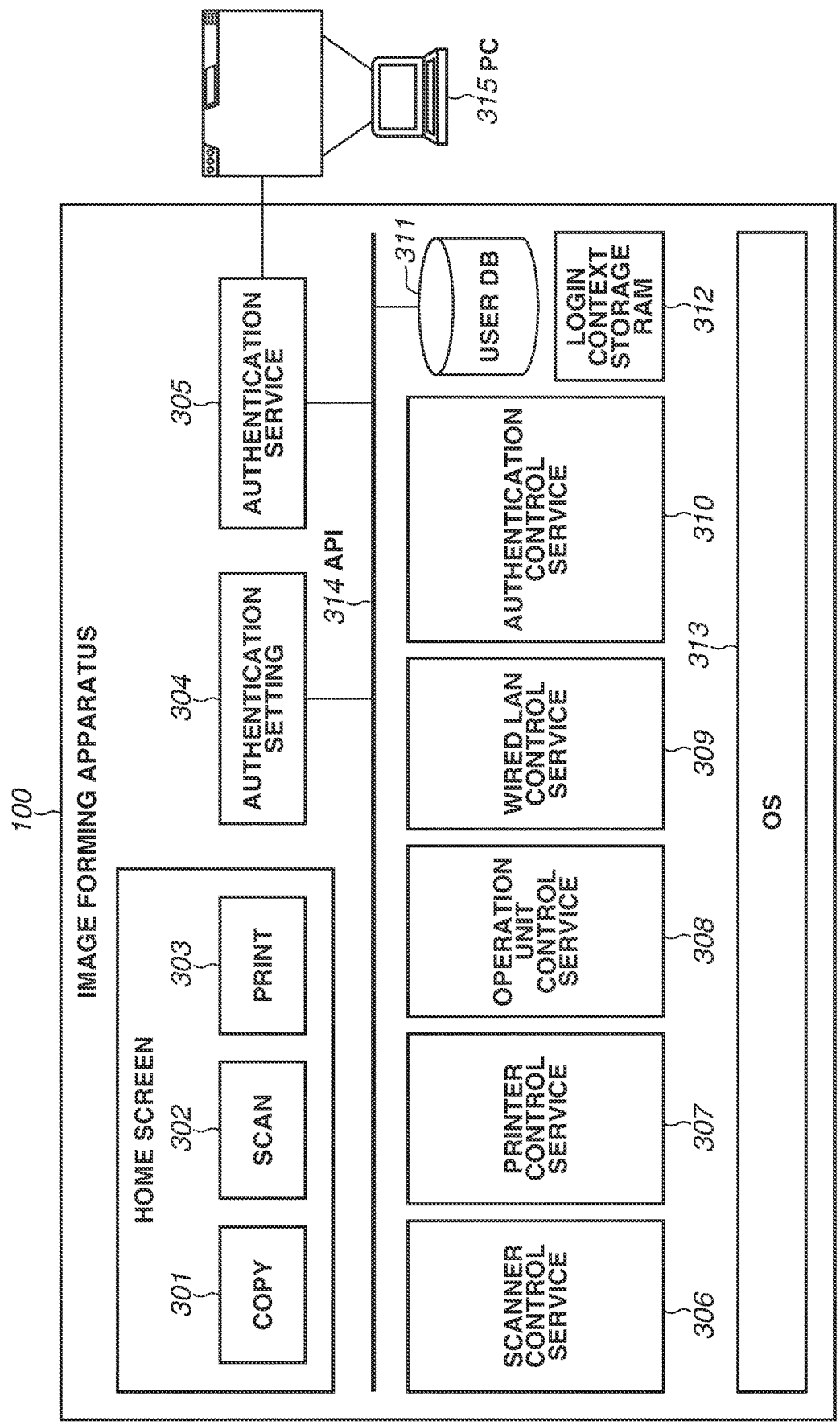
FIG. 3 illustrates a software configuration and a data area managed by software.

FIG. 3 is a software configuration diagram of the image forming apparatus 100. The image forming apparatus 100 in FIG. 3 includes a copy 301, a scan 302, a print 303, an authentication setting 304, and an authentication service 305 as applications operating on a platform. The above-described applications communicate with various control services via an application program interface (API) 314 and start up the applications. The various control services are a group of modules including a scanner control service 306, a printer control service 307, an operation unit control service 308, a wired LAN control service 309, and an authentication control service 310. The image forming apparatus 100 further includes a user database (DB) 311 that stores user information, and a login context storage random access memory (RAM) 312 that stores a login context of a user who has executed a login.

The copy 301, the scan 302, the print 303, the authentication setting 304, and the authentication service 305 provide a user interface that can be operated by a user.

The authentication service 305 provides a local authentication service function and a remote authentication service function for logging in to the image forming apparatus 100. Further, the authentication service 305 manages a login user by registering a new user, changing user information, and the like using the information stored in the user DB 311.

Settings related to the management of the login user and various types of authentication can be set by performing remote access from the authentication setting 304 or the PC 315 after the user logs in to the image forming apparatus 100.

Each of the functions according to the above-described embodiment can be implemented by a program described in a legacy programming language or an object-oriented programming language, such as an assembly language, C, C++, Visual C++, Perl, Ruby, or JAVA (registered trademark), JavaBeans, JavaApplet, and JavaScript, which are registered trademarks of Oracle Corporation, and can be distributed by being stored in a device-readable storage medium.

Figure 4:
FIG. 4 illustrates examples of authentication screens provided by an image forming apparatus.

FIG. 4 illustrates examples of authentication screens provided by the image forming apparatus 100.

<Card Authentication Service>

A card authentication service is a service that executes authentication processing if a user touches the card reader 202 provided in the image forming apparatus 100 with a card. The user touches the card reader 202 provided in the image forming apparatus 100 with a card possessed by the user himself/herself in a state in which a card authentication screen 401 is displayed on the image forming apparatus 100. The image forming apparatus 100 reads a card identification (ID) by the card reader 202. The image forming apparatus 100 inquires the acquired card ID of an authentication destination database and searches for a card ID associated with a user account. As a result of the search, in a case where the card ID is registered, the image forming apparatus 100 executes the authentication processing using the registered user account. In a case where the card ID read by the card reader 202 is not registered, an authentication error occurs, and the image forming apparatus 100 displays the card authentication screen 401 again.

When using the card authentication service, the user registers the card ID in the authentication destination database in advance. With regard to a registration method of the card ID, the user may register the card ID by directly inputting the card ID to the operation unit 201 of the image forming apparatus 100, or by allowing the card reader 202 to read the card ID. At the time of registering the card, the user inputs the user account and a password to the image forming apparatus 100 and thus user confirmation processing is executed. The user information (the user account and the password) registered in advance is identified by the user confirmation processing, and the identified user information is associated with the card ID. A database to be used in the user confirmation processing is the same as the authentication destination database. Thus, in a case where the user information is not registered in the authentication destination database, a user confirmation error occurs, and registration processing of the card ID is canceled.

If the user confirmation processing is successful, the user touches the card reader 202 with the card that he/she wants to register to execute association between the user account and the card ID, and subsequently the user can use the card authentication service.

<User Account Authentication Service>

A user account authentication service is a service that authenticates a user by prompting the user to input a user account and a password via a local user interface (UI) of the image forming apparatus 100 or a remote UI of the PC 315 or a mobile device.

The user who intends to use the image forming apparatus 100 inputs a user account 405 and a password 406 in text fields on an account authentication screen 402 displayed on the local UI and presses a login button 407. At that time, in a case where information about the user account and the password is registered in the authentication destination database, the user succeeds in the authentication processing and can use the image forming apparatus 100. In a case where the user account does not exist or a password input is inconsistent, an authentication error occurs, and the account authentication screen 402 is displayed.

In using the user account authentication service, a user registers authentication information in the authentication destination database. A user who can register the authentication information is a user who has the administrator authority.

<Personal Identification Number Authentication Service>

A personal identification number authentication service is an authentication service that logs the user in to the image forming apparatus 100 by allowing the user to input a personal identification number via the local UI of the image forming apparatus 100 or the remote UI of the PC 315 or the mobile device.

In the present embodiment, it is assumed that the personal identification number authentication service is used in combination with the IC card authentication, so that an authentication procedure and user registration processing are the same as those of the user account authentication service. A personal identification number 408 to be input on a personal identification number input screen 403 may be the same as the password 406 on the account authentication screen 402. Alternatively, a personal identification number issued by the image forming apparatus 100 and displayed on a screen of the PC 315 at the time when a job is input from the PC 315 to the image forming apparatus 100 may be input to the personal identification number input screen 403. The personal identification number in this case has an expiration date.

<Pattern Authentication Service>

The pattern authentication used in the present embodiment is described. As the pattern authentication, a mechanism of a pattern lock that operates on an Android operating system (OS), which is a registered trademark of Google, is adopted. A user registers a pattern to be used in the pattern authentication in the authentication setting 304 in advance and inputs a trajectory of the pattern by tracing dots drawn on a pattern input screen 404 via a touch panel of the image forming apparatus 100. At least a plurality of dots among the drawn dots is used. In a case where the trajectory of the pattern matches the registered pattern, the user can use the function of the image forming apparatus 100. In a case where the trajectory of the pattern does not match the registered pattern, an authentication error occurs, and the pattern input screen 404 is displayed.

The pattern authentication processing is started at timing when the user finishes input processing of the pattern and releases his/her finger from the touch panel.

Regarding a pattern dot, numbers as indicated on the pattern input screen 404 are internally stored (the numbers are not displayed on the screen), and in a case where a pattern is registered in the user database, an array number of the pattern dot is managed and stored in the user database.

<User Information Registered in Database>

The user information registered in the authentication destination database is indicated below in Table 1.

TABLE 1

| User Information Registered in Database | | | | | |
|---|---|---|---|---|---|
| User Name | Card ID | Personal Identification Number | Password | Pattern | Use Authority of Image Forming Apparatus |
| Alice | 44E7158E . . . | 1234 | * * * | 14789 | Administrator |
| Bob | 045BB438 . . . | 5678 | * * * | 1235784 | General User |
| Carol | 0654B139 . . . | 13579 | * * * |  | General User |
| Dave | 2253R440 . . . |  | * * * | 2356 | General User |

"User Name" and "Password" in Table 1 are referred to at the time of the authentication processing of <User Account Authentication Service> and registration processing of <Card Authentication Service> described above. "Card ID" in Table 1 is referred to at the time of the authentication processing of <Card Authentication Service>. "Personal Identification Number" and "Pattern" are referred to at the time of executing <Personal Identification Number Authentication Service> and <Pattern Authentication Service>. In a case where the multifactor authentication is set to the image forming apparatus 100, it is assumed that "Pattern" or "Personal Identification Number" is referred to at the time of executing the authentication processing of a second factor that is input after execution of the card authentication service. "Use Authority of Image Forming Apparatus" in Table 1 indicates authority information of the user, and the user who has the administrator authority can set the authentication method using a method described below (FIG. 5).

<Functional Authentication>

The image forming apparatus 100 provides a device authentication mode in which the authentication screens illustrated in FIG. 4 are displayed in a case where a user uses the apparatus, and the user can use the functions of the image forming apparatus 100 only after the authentication processing is successful, and a functional authentication mode in which the authentication screen is displayed in a case where the user uses the application stored in the image forming apparatus 100. The authentication is executed for each application in the functional authentication mode. Thus, for example, an administrator user can perform settings in such a manner that the authentication processing is executed for copying, while printing can be used without execution of the authentication processing.

It is assumed that the multifactor authentication described in the present embodiment is used in the device authentication mode or the functional authentication mode. Thus, a setting content in an authentication setting screen 501 described below is applied to device authentication in a case where the image forming apparatus 100 is in the device authentication mode and is applied to functional authentication in a case where the image forming apparatus 100 is in the functional authentication mode.

<Authentication Setting Screen>

The authentication setting screen 501 included in the image forming apparatus 100 is described with reference to FIG. 5.

The authentication setting screen 501 includes contents related to the multifactor authentication used in each authentication service.

Whether to apply (enable or disable) the multifactor authentication to the image forming apparatus 100 is determined by a setting content of a setting item 502. It is possible to set whether a target of the multifactor authentication is "all users" or "administrator only" in the setting item 502. In a case where the multifactor authentication setting is set to "all users", the multifactor authentication is applied to all the users who are registered in the database referred to by the image forming apparatus 100. In a case where the multifactor authentication setting is set to "administrator only", the multifactor authentication setting is applied only to the administrator user, and other users are authenticated by the authentication processing using only one factor. Specifically, the image forming apparatus 100 checks the authority information of the user in the user database in Table 1 at the time of execution of the authentication of the first factor. In a case where the user is the administrator user, the image forming apparatus 100 displays the authentication screen 102 for the second factor and executes the multifactor authentication. In the case of a general user, the authentication screen 102 is not displayed, and it is determined whether the user can use the image forming apparatus 100 by the authentication processing of the first factor.

If the multifactor authentication setting is set to "all users" or "administrator only", the personal identification number authentication or the pattern authentication can be set to the second factor. As an item not described in FIG. 5, for example, password authentication may be selectable as the second factor.

Further, it is possible to set to prompt the user to select the authentication method for the second factor between the personal identification number authentication and the pattern authentication. FIG. 5 illustrates a state in which the setting of the authentication method is being made. The personal identification number authentication and the pattern authentication are displayed as a plurality of options of the authentication method.

Check boxes of "personal identification number" and "pattern" are filled in, which indicate that both are selected as the authentication method for the second factor. This means that the authentication method for the second factor is to be selected as in the authentication screen 102 in FIG. 1. In addition, the administrator can specify an array of dots in a form of a 3*3 pattern array, a 4*4 pattern array, or a 5*5 pattern array as a setting item for the pattern authentication. The authentication screen for the pattern authentication is displayed based on the setting content.

In a case where it is desired that the authentication method for the second factor is fixed to either the personal identification number authentication or the pattern authentication, the check box of the desired authentication method is to be checked and the check box of the other authentication method is not to be checked.

"Policy setting for second factor" 504 is a policy setting item for authentication using the second factor in the multifactor authentication. A policy is set to the factor selected in "authentication used for multi-factor authentication" 503. In a case where the personal identification number is enabled (the check box of "personal identification number" is filled in), a policy for using the personal identification number can be set, and the personal identification number that is registered in the user database with less than the specified number of digits is prohibited from being used. In a case where the pattern is enabled (the check box of "pattern" is filled in), the pattern with less than the specified number of dots can be prohibited. For example, in a case where the number of pattern dots of four dots or less is prohibited, a user name Dave whose number of pattern dots is less than or equal to four in Table 1 cannot use the pattern authentication.

In a case where "English alphabet is prohibited" is enabled as a policy setting of the pattern authentication, a pattern trajectory that corresponds to an English alphabet is prohibited. For example, the pattern of the user Alice is "14789" (in Table 1), and in a case where the number of dots is 3*3, the pattern trajectory corresponds to the English alphabet "L" and thus cannot be used in the pattern authentication.

"Second factor setting at the time of functional authentication" 505 can be set only in a case where the functional authentication mode is enabled, and an available authentication method can be set for each application. In the example illustrated in FIG. 5, "pattern is prohibited" is set in the case of using the print application, so that the multifactor authentication can be executed by the authentication method other than the pattern authentication. In the case of using the copy application, there is no particular restriction on the available authentication method.

FIG. 5 illustrates the example in which the authentication method for the first factor is fixed, and the authentication method for the second factor is selectable by a user, but a configuration in which only the first factor is selectable by a user or both of two factors are selectable by the user is also possible. In the present embodiment, a case where the authentication factor includes two factors is described, but, in a case where the authentication factor includes three or more factors, the authentication method for at least one of the factors may be selected by a user.

<Description of Procedure According to Present Invention>

Figure 6A:
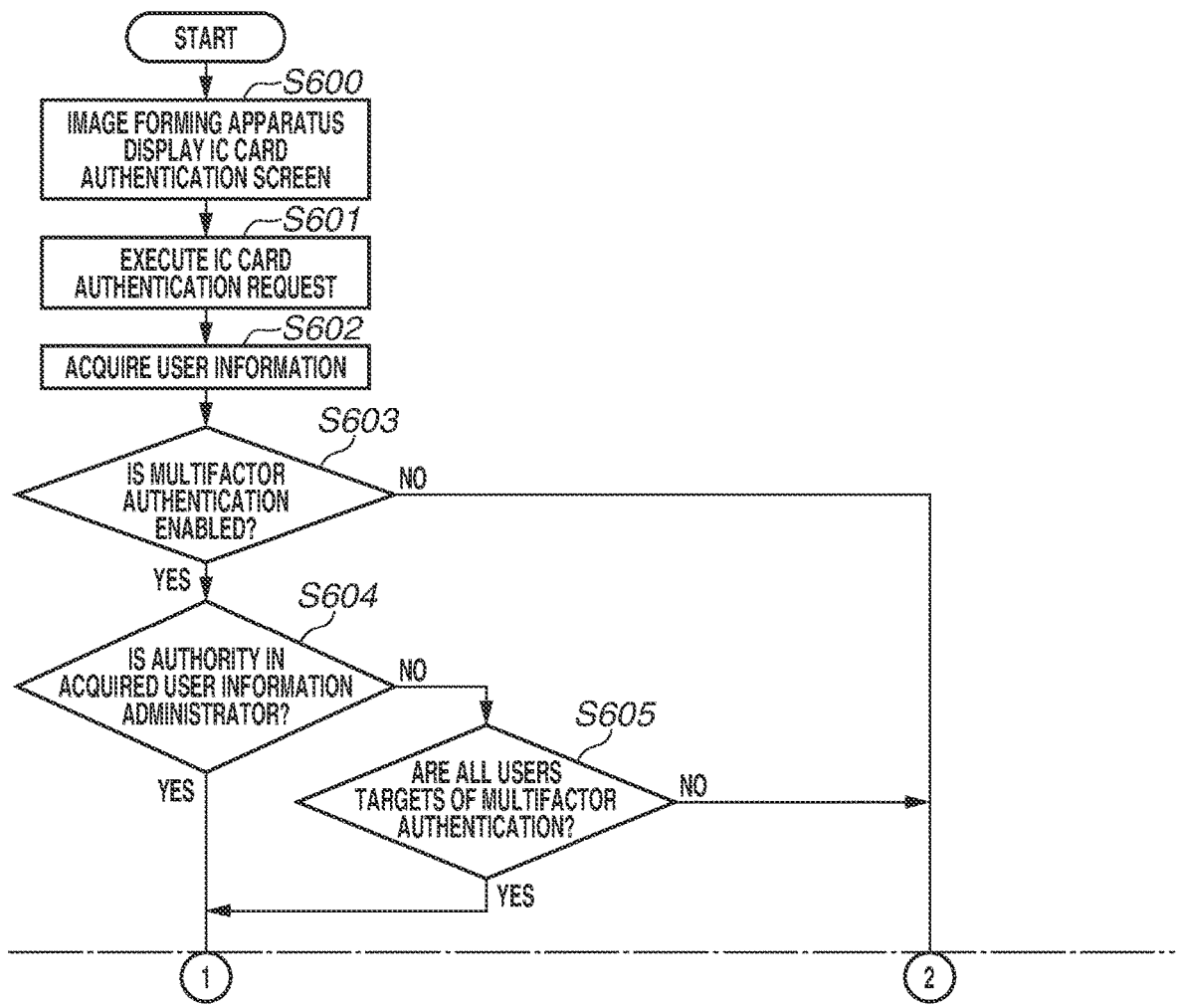
FIGS. 6A and 6B are a flowchart illustrating multifactor authentication.
Figure 6B:
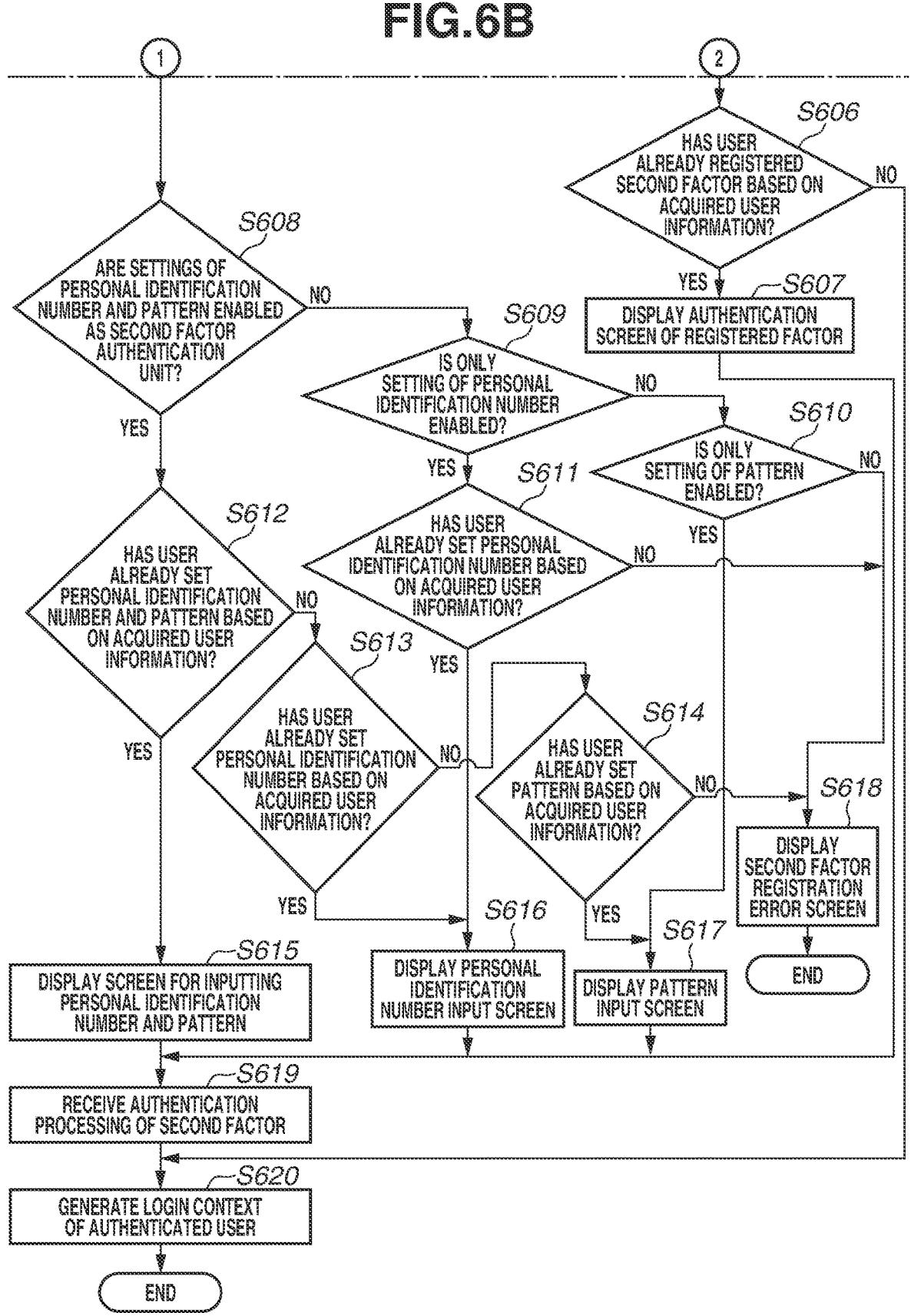

Next, a procedure in which the CPU 206 of the image forming apparatus 100 loads a program stored in a read-only memory (ROM) 203 area into a RAM 204 and executes the program is described with reference to a flowchart in FIG. 6. In FIG. 6, a multifactor authentication procedure in which <Card Authentication Service> can be set to the first factor and <Personal Identification Number Authentication Service> and <Pattern Authentication Service> can be set to the second factor in execution of the multifactor authentication is described as an example. However, as described above, the combination, the number, and order of the factors are not particularly limited.

<Multifactor Authentication Procedure>

The multifactor authentication procedure to be executed by a user already registered in the image forming apparatus 100 is described below.

In step S600, at the time of execution of the multifactor authentication, the image forming apparatus 100 displays the card authentication screen 401 corresponding to the first factor. In step S601, an IC card authentication request is executed, and then in step S602, the image forming apparatus 100 executes the authentication processing based on IC card information. In a case where the IC card information is registered in the database referred to by the image forming apparatus 100, the authentication is successful, whereas in a case where the IC card information is not registered, the authentication is a failure, and the display of the card authentication screen 401 is continued. In step S602, if the authentication is successful, the user information of the authenticated user is acquired from the database.

In step S603, the image forming apparatus 100 refers to the information set on the authentication setting screen 501, and confirms whether the multifactor authentication is enabled. In a case where the multifactor authentication is enabled (YES in step S603), in step S604, the image forming apparatus 100 refers to the user information acquired in step S602. In a case where the authority information in the user information is "administrator" (YES in step S604), then in step S608, the image forming apparatus 100 refers to a setting value of the second factor authentication unit in the authentication setting indicated in "authentication used for multi-factor authentication" 503 and confirms whether the personal identification number and the pattern are set. In a case where both the personal identification number and the pattern are enabled (YES in step S608), in step S612, the image forming apparatus 100 confirms whether the personal identification number and the pattern are already registered in the user database based on the user information acquired in step S602.

In a case where the user has already registered the personal identification number and the pattern (YES in step S612), in step S615, the image forming apparatus 100 displays the authentication screen 102 (FIG. 1) on which both the personal identification number and the pattern can be input.

As a result of the determination in step S612, in a case where only the personal identification number is enabled (YES in step S613), or only the pattern is enabled (YES in step S614) as the authentication method for the second factor, the image forming apparatus 100 displays the authentication screen (403 or 404) on which the authentication method for the second factor registered can be executed.

In a case where neither the personal identification number nor the pattern is enabled (NO in step S614), in step S618, the image forming apparatus 100 displays a second factor registration error screen (not illustrated) and ends the processing. In the present embodiment, in a case where the multifactor authentication setting is enabled and all of the authentication methods for the second factor are disabled, the error screen is displayed. Alternatively, in a case where the authentication method for the second factor is not selected even though the multifactor authentication setting is enabled at a stage of performing a setting on the authentication setting screen 501 in FIG. 5, an error message may be displayed or the authentication setting screen 501 may be prevented from being closed unless the authentication method for the second factor is selected.

After the authentication screen is displayed (in steps S615 to S617, and S607), in step S619, the image forming apparatus 100 displays the authentication screen to receive the authentication processing of the second factor.

After completing the reception of the authentication processing, in step S620, the image forming apparatus 100 generates a login context of the authenticated user and ends the processing. In a case where an error occurs in the authentication processing in step S619, the image forming apparatus 100 displays the authentication screen corresponding to a processing content in each of steps S615 to S617 and prompts the user to re-enter the authentication information.

When the authentication processing of the second factor is completed, the user can use the functions provided by the image forming apparatus 100. For example, a menu screen (not illustrated) for selecting the copy function, the scan function, or the like of the image forming apparatus 100 may be displayed. Alternatively, in a case where a setting screen of a specific function is set as an initial screen, the setting screen may be displayed when the authentication processing of the second factor is completed.

In a case where the authority information in the user information acquired in step S602 is the general user (NO in step S604), in step S605, the image forming apparatus 100 refers to the setting item 502 to check whether the user corresponding to the multifactor authentication is "administrator only" or "all users".

As a result of referring to the setting item 502, in a case where "all users" are targets of the multifactor authentication (YES in step S605), in step S608 and subsequent steps, the image forming apparatus 100 executes multifactor authentication processing similar to that of the administrator user. In a case where the target user is "administrator only" (NO in step S605), in steps S606 and S607, a below-described "authentication flow in a case where the multi-factor authentication is not set" is executed.

<Multifactor Authentication Procedure in a Case where Second Factor Authentication Unit is Only One>

In step S608, the image forming apparatus 100 confirms the second factor authentication unit based on the authentication setting screen 501. In step S609, in a case where only the setting of the personal identification number is enabled as the authentication method for the second factor (YES in step S609), in step S611, the image forming apparatus 100 confirms whether the user has already registered the personal identification number based on the acquired user information.

As a result of the confirmation, in a case where the user has already registered the personal identification number (YES in step S611), in step S616, the image forming apparatus 100 displays the personal identification number input screen 403. In a case where the user has not registered the personal identification number (NO in step S611), in step S618, the image forming apparatus 100 displays the second factor registration error screen and ends the processing.

As a result of the determination in steps S608 and S609, in step S610, in a case where only the setting of the pattern is enabled as the authentication method for the second factor (YES in step S610), in step S617, the image forming apparatus 100 displays the pattern input screen 404. In a case where the user has not registered the pattern (NO in step S610), in step S618, the image forming apparatus 100 displays the second factor registration error screen and ends the processing.

<Authentication Procedure in a Case where Multifactor Authentication is not Set>

In step S603, in a case where it is determined that the multifactor authentication setting is not enabled (NO in step S603), in step S606, the image forming apparatus 100 determines whether the user has registered the authentication information about the second factor based on the user information acquired in step S602. In a case where the user has registered one or more second factors (YES in step S606), in step S607, the image forming apparatus 100 displays the authentication screen of the registered factor. In a case where the second factor is not registered (NO in step S606), the image forming apparatus 100 executes the authentication processing based on the user information acquired in the IC card authentication request in step S601 and executes login processing by generating the login context of the authenticated user in step S620. The image forming apparatus 100 may generate a user context by displaying a predetermined authentication screen without executing the processing in step S606.

Next, a procedure for confirming the policy in a case where the authentication screen for the second factor is displayed in steps S615 to S617 is described with reference to FIG. 7. The procedure in FIG. 7 is executed in each of steps S615 to S617.

<Policy Confirmation Procedure in Execution of Second Factor Screen Display>

In step S701, the authentication screen for the second factor is determined by user information acquisition processing and the authentication setting screen 501, and then in step S702, the image forming apparatus 100 refers to the "policy setting for second factor" 504. In a case where the policy setting is not enabled (the policy is not set, NO in step S702), the image forming apparatus 100 displays the authentication screen for the second factor and ends the processing. In a case where the policy setting is enabled (the policy is set, YES in step S702), in step S703, the image forming apparatus 100 refers to the authentication information registered in the second factor of the user in an authentication database and determines whether the authentication information about the second factor satisfies the policy. In a case where the policy is not satisfied (NO in step S703), the processing proceeds to step S704. In a case where the policy is satisfied (YES in step S703), in step S707, the image forming apparatus 100 displays the authentication screen for the second factor.

A specific method for determining whether the policy setting is enabled in step S702 is described. In the "policy setting for second factor" 504, the policy of the personal identification number authentication and the policy of the pattern authentication are set. With regard to the policy setting, a type of authentication method to be used in each of steps S615 to S617 is different. The personal identification number authentication and the pattern authentication are used in step S615, only the personal identification number authentication is used in step S616, and only the pattern authentication is used in step S617. The "policy setting for second factor" 504 corresponding to the authentication method used in each step is referred to in step S702. For example, in the case of step S615, both the policy of the personal identification number authentication and the policy of the pattern authentication are referred to in step S702.

In step S703, in a case where it is determined that the authentication information about the second factor of the user does not satisfy the policy, the image forming apparatus 100 refers to other authentication information registered by the user in the authentication database as the second factor.

In step S704, the image forming apparatus 100 determines whether the authentication information satisfies the policy. For example, in a case where it is determined that the user is a user whose personal identification number and pattern are set in step S612, it is determined whether to display the authentication screen 102 including an input area of the personal identification number and an input area of the pattern in the flowchart in FIG. 7. In step S703, if it is determined that the personal identification number of the user registered in the authentication database does not satisfy the policy (NO in step S703), in step S704, it is determined whether the pattern of the user registered in the authentication database satisfies the policy.

In step S704, if it is determined that the registered authentication information does not satisfy the policy (NO in step S704), in step S706, the image forming apparatus 100 displays an error message. If it is determined that the registered authentication information satisfies the policy (YES in step S704), in step S707, the image forming apparatus 100 displays the authentication screen for the second factor and ends the processing. For example, in step S704, if it is determined that the pattern of the user registered in the authentication database satisfies the policy, the pattern input screen 404 is displayed. In step S704, if it is determined that the policy is not satisfied, the image forming apparatus 100 displays the error message. In other words, in step S612, even if it is determined that the user is a user who has set the personal identification number and the pattern, the authentication screen 102 is not always displayed as the authentication screen for the second factor, and a display content of the authentication screen for the second factor differs depending on determination results in steps S703 and S704.

Further, whether to execute the processing in step S704 also differs depending on setting contents in steps S612 and S614. In a case where the authentication method for the second factor is limited to one by the determination result in step S612 or S614 (for example, only the pattern authentication or only the personal identification number authentication), there is only one authentication information that is a determination target for determining whether the policy is satisfied in FIG. 7. Thus, in step S703, if it is determined that the policy is not satisfied, the image forming apparatus 100 advances the processing to step S706 without performing step S704 and ends the processing. The above is the description of FIG. 7.

A procedure regarding a notification of the factor to be displayed after receiving the authentication processing of the second factor in step S619 is described below.

<Notification Screen Display Procedure of Another Factor>

FIG. 8 is a flowchart illustrating display of a notification screen for another factor. The present procedure can be executed in a case where the settings of the personal identification number and the pattern are enabled in step S608 as the above-described second factor authentication unit.

In step S801, the image forming apparatus 100 confirms that the settings of the personal identification number and the pattern are enabled as the second factor authentication unit. Then in step S802, the image forming apparatus 100 receives the authentication processing of the second factor and confirms the factor registered as the authentication information about the second factor based on the acquired user information. As a result of the confirmation, in a case where only one of the factors, i.e., the personal identification number or the pattern, is registered as the authentication information of the user (YES in step S803), after executing the authentication processing of the second factor, in step S805, the image forming apparatus 100 notifies the user that another factor can be additionally registered as the authentication information.

The notification in step S805 is a function to be executed at the time of a first login of the user. Thus, in step S804, it is determined whether it is the first login, and if it is determined that the login is a second or subsequent login (NO in step S804), only the authentication processing is executed without performing the notification. A processing content in step S806 is the same as that in step S620, and thus the description thereof is omitted. The above is the description of the procedure regarding the notification of the factor to be displayed after reception of the authentication processing of the second factor in step S619.

Figure 9:
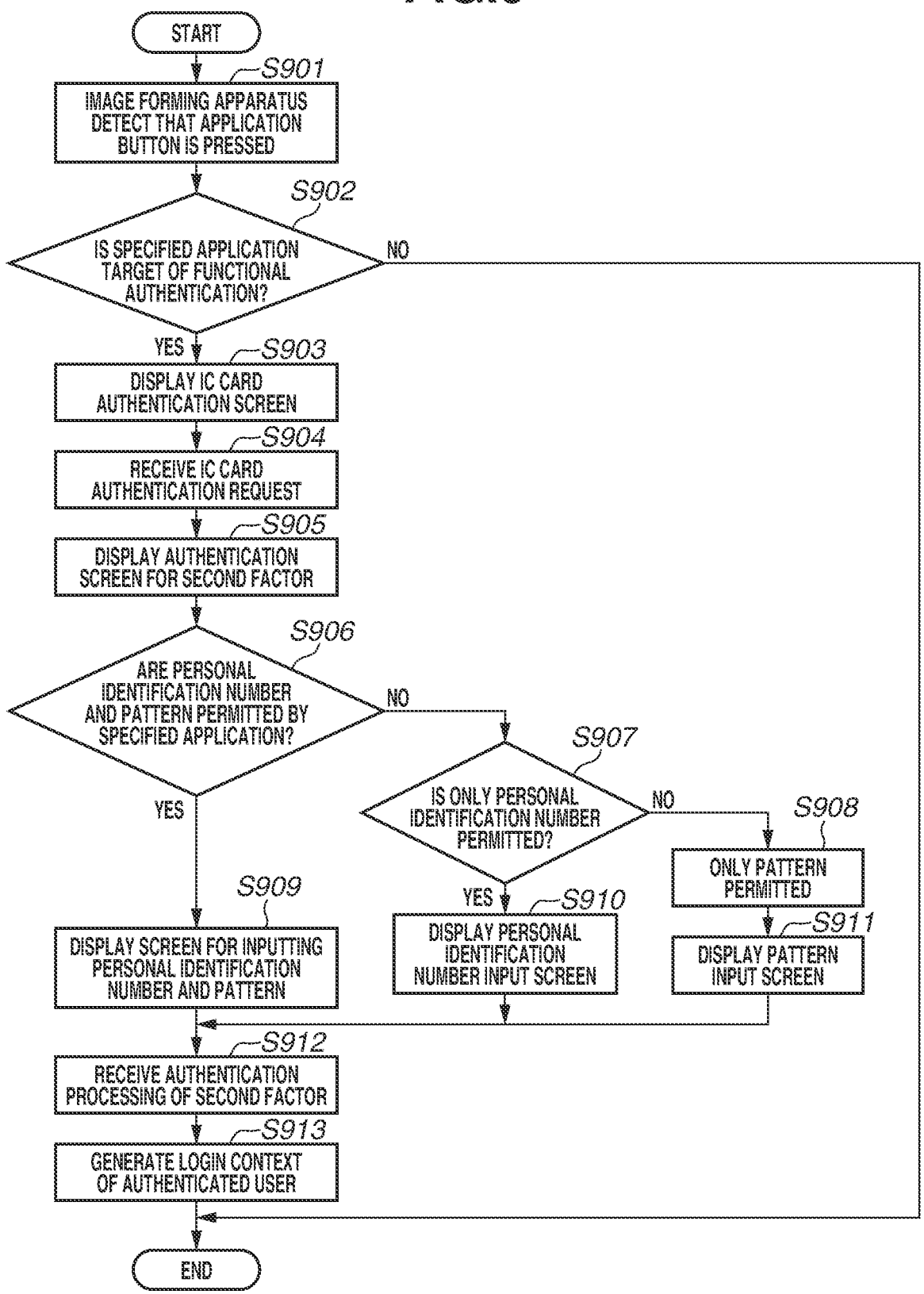
FIG. 9 is a flowchart illustrating multifactor authentication at a time when functional authentication is enabled.

As described in <Functional Authentication>, the image forming apparatus 100 can select the device authentication mode and the functional authentication mode. A multifactor authentication procedure at the time when the functional authentication is enabled is described with reference to FIG. 9.

<Multifactor Authentication Procedure at the Time when Functional Authentication is Enabled>

The present procedure is described on the assumption that the personal identification number and the pattern are enabled as the second factor authentication unit on the authentication setting screen 501 and a user who uses the device is the administrator who has registered the personal identification number and the pattern.

In step S901, the image forming apparatus 100 detects that an application button is pressed.

If the application button is selected, in step S902, the image forming apparatus 100 confirms whether the application specified by pressing of the application button is a target of the functional authentication. In a case where the specified application is not the target of the functional authentication (NO in step S902), the image forming apparatus 100 does not execute display processing of the authentication screen and ends the processing.

In a case where the specified application is the target of the functional authentication (YES in step S902), in step S903, the image forming apparatus 100 performs display processing of an IC card authentication screen. After executing the display processing, in step S904, the image forming apparatus 100 receives an IC card authentication request. After executing the authentication processing of the first factor, in step S905, the image forming apparatus 100 executes display processing of the authentication screen for the second factor. Whether to adopt the IC card authentication in the authentication in a first stage is based on the setting content in the authentication 503 on the authentication setting screen 501 as described above.

In step S906, the image forming apparatus 100 refers to the "second factor setting at the time of functional authentication" 505 and confirms which second factor is permitted by the specified application.

In a case where both the personal identification number and the pattern are permitted as the factors that can be specified as the second factor (YES in step S906), in step S909, the image forming apparatus 100 executes display processing of the authentication screen 102 on which the personal identification number and the pattern can be input. In step S907, in a case where only the personal identification number is permitted (YES in step S907), in step S910, the image forming apparatus 100 displays the personal identification number input screen 403. In step S908, in a case where only the pattern is permitted, in step S911, the image forming apparatus 100 displays the pattern input screen 404.

After displaying the authentication screen for the second factor in steps S909 to S911, in step S912, the image forming apparatus 100 receives the authentication processing of the second factor and, in step S913, generates the login context of the authenticated user. The above is the description of the display processing of the authentication screen in the functional authentication mode.

In the above-described embodiments, in a case where the multifactor authentication is executed, a user is prompted to select the authentication processing to be used for a second factor within a range set by the administrator. Accordingly, the user can adopt a desired authentication method as the authentication method for the second factor, and thus usability at the time of multifactor authentication can be improved.

In the above-described embodiments, the user is prompted to select at least one of authentication methods of the multifactor authentication setting, and thus convenience in the multifactor authentication can be improved while the security is enhanced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is determined by the scope of the following claims.

This application claims the benefit of Japanese Patent Application No. 2021-143746, filed Sep. 3, 2021, which is hereby incorporated by reference herein in its entirety.

What is claimed is:

1. An information processing apparatus configured to authenticate a user in first authentication processing and second authentication processing and permit the user who is authenticated to use at least one of a plurality of functions, the information processing apparatus comprising:

a control unit configured to, at a time of authentication of the user in the first authentication processing, perform control to prompt the user to select an authentication method to be used in the first authentication processing; and a setting unit configured to set the authentication method to be used in the first authentication processing, wherein the setting unit is configured to display a plurality of selectable authentication methods as options for the first authentication processing, and in a case where the options include pattern authentication, the setting unit is configured to display selectable options for a number of dots to be used in the pattern authentication.

2. The information processing apparatus according to claim 1, further comprising a display unit, wherein the control unit is configured to control the display unit to display a first authentication screen to be used in the first authentication processing and a second authentication screen to be used in the second authentication processing, and wherein the control unit is configured to perform control, at the time of authentication of the user in the first authentication processing, to prompt the user to select the authentication method to be used in the first authentication processing on the first authentication screen.

3. The information processing apparatus according to claim 2, wherein the control unit is configured to control the display unit to display the second authentication screen and, if the user is authenticated by the second authentication processing using the second authentication screen, to display the first authentication screen.

4. The information processing apparatus according to claim 2, wherein the first authentication screen includes an area used to execute the first authentication processing by a first authentication method and an area used to execute the first authentication processing by a second authentication method.

5. The information processing apparatus according to claim 4, wherein the area used to execute the first authentication processing by the first authentication method includes a plurality of dots, and wherein the first authentication method is a method in which the user selects a pattern of dots among the plurality of dots and authentication is performed based on the pattern of the selected dots.

6. The information processing apparatus according to claim 1, wherein the setting unit is configured to allow a user having administrator authority to set a setting content.

7. The information processing apparatus according to claim 1, wherein the information processing apparatus has the plurality of functions, and wherein, if authentication of the user in the first authentication processing and the second authentication processing is completed, a menu screen for selecting from the plurality of functions is displayed.

8. The information processing apparatus according to claim 7, wherein at least one of the plurality of functions is a function using a copy function.

9. A method for controlling an information processing apparatus that authenticates a user in first authentication processing and second authentication processing and permits the user who is authenticated to use at least one of a plurality of functions, the method comprising:

performing control, at a time of authentication of the user in the first authentication processing, to prompt the user to select an authentication method to be used in the first authentication processing; and setting the authentication method to be used in the first authentication processing, wherein the setting includes displaying a plurality of selectable authentication methods as options for the first authentication processing, and in a case where the options include pattern authentication, displaying selectable options for a number of dots to be used in the pattern authentication.

10. A non-transitory computer-readable storage medium storing a program for causing a computer to carry out the method according to claim 9.

* * * * *